United States Patent
Roach

(10) Patent No.: US 9,580,161 B1
(45) Date of Patent: Feb. 28, 2017

(54) REINFORCING RIPSTOP TAPE FOR BURST MITIGATION

(71) Applicant: X Development LLC, Mountain View, CA (US)

(72) Inventor: Kevin Roach, Boulder Creek, CA (US)

(73) Assignee: X Development LLC, Mountain View, CA (US)

(*) Notice: Subject to any disclaimer, the term of this patent is extended or adjusted under 35 U.S.C. 154(b) by 0 days.

(21) Appl. No.: 14/509,503

(22) Filed: Oct. 8, 2014

Related U.S. Application Data

(60) Provisional application No. 61/918,854, filed on Dec. 20, 2013.

(51) Int. Cl.
*B64B 1/40* (2006.01)
*B64B 1/58* (2006.01)
*B29C 65/50* (2006.01)
*B29L 22/02* (2006.01)

(52) U.S. Cl.
CPC ............ *B64B 1/58* (2013.01); *B29C 65/5014* (2013.01); *B29C 65/5042* (2013.01); *B64B 1/40* (2013.01); *B29L 2022/022* (2013.01)

(58) Field of Classification Search
CPC .... B64B 1/40; B64B 1/58; B64B 1/50; B64B 1/14; A63H 27/10; B64C 2201/022; B64C 2201/101
USPC ......................................... 244/31, 32, 33, 24
See application file for complete search history.

(56) References Cited

U.S. PATENT DOCUMENTS

| | | | | |
|---|---|---|---|---|
| 3,608,849 A * | 9/1971 | Underwood | .............. | B64B 1/58 244/133 |
| 3,860,201 A * | 1/1975 | Hall | .......................... | B64B 1/58 244/152 |
| 4,402,476 A * | 9/1983 | Wiederkehr | .............. | B64B 1/62 244/31 |
| 4,711,416 A * | 12/1987 | Regipa | ...................... | B64B 1/60 244/126 |
| 4,877,205 A * | 10/1989 | Rand | ....................... | B29C 65/18 156/160 |

(Continued)

OTHER PUBLICATIONS

A. L. Morris. "Scientific Ballooning Handbook." NCAR Technical Note. Atmospheric Technology Division, National Center for Atmospheric Research. May 1975, 258 pages.

(Continued)

*Primary Examiner* — Benjamin P Lee
(74) *Attorney, Agent, or Firm* — Lerner, David, Littenberg, Krumholz & Mentlik, LLP

(57) ABSTRACT

Aspects of the disclosure relate to fabricating balloon envelopes for high-altitude balloons. One or more segments of reinforcing tape are applied to gore segments of the balloon envelope. The segments are arranged in a ring to circumscribe an upper portion of the balloon envelope, and may be affixed by a pressure sensitive adhesive. Should a catastrophic failure of the balloon envelope occur, the reinforcing tape acts as a ripstop to prevent a tear from extending upward toward the apex of the balloon envelope. Tendons secured to the apex and to a base of the balloon envelope are configured to keep the top film of the envelope in a parachute configuration in the event of a catastrophic failure. The reinforcing tape is positioned above an equator of the balloon envelope, for instance approximately ⅓ of the distance down from the apex to the base of the envelope.

8 Claims, 7 Drawing Sheets

(56) References Cited

U.S. PATENT DOCUMENTS

| | | | | |
|---|---|---|---|---|
| 5,104,059 | A * | 4/1992 | Rand | B64B 1/42 244/126 |
| 5,149,019 | A | 9/1992 | Stenlund | |
| 5,940,023 | A | 8/1999 | Hintzke et al. | |
| 5,967,459 | A | 10/1999 | Hayashi | |
| 6,056,241 | A | 5/2000 | Kasher | |
| 6,290,172 | B1 * | 9/2001 | Yajima | B64B 1/58 244/31 |
| 6,325,329 | B1 * | 12/2001 | Meadows | B64B 1/40 244/31 |
| 6,935,963 | B2 * | 8/2005 | Meadows | A63G 31/00 244/26 |
| 8,074,638 | B2 * | 12/2011 | Cummings | F24J 2/1052 126/569 |
| 9,027,877 | B1 * | 5/2015 | Brookes | B64B 1/58 137/223 |
| 9,033,274 | B2 * | 5/2015 | DeVaul | B64B 1/62 244/31 |
| 9,067,666 | B1 * | 6/2015 | Roach | B64B 1/42 |
| 9,254,906 | B1 | 2/2016 | Behroozi et al. | |
| 9,296,461 | B1 * | 3/2016 | Roach | B64B 1/58 |
| 2009/0220726 | A1 | 9/2009 | Liggett et al. | |
| 2014/0014770 | A1 * | 1/2014 | Teller | B64B 1/40 244/97 |
| 2014/0158823 | A1 * | 6/2014 | Smith | B64B 1/44 244/1 A |
| 2014/0203135 | A1 * | 7/2014 | Walter | B64B 1/64 244/31 |
| 2015/0174817 | A1 * | 6/2015 | Roach | B64B 1/58 156/64 |
| 2015/0266559 | A1 * | 9/2015 | Roach | B64B 1/42 244/31 |
| 2015/0367928 | A1 * | 12/2015 | Crites | B64B 1/40 244/31 |
| 2016/0083068 | A1 * | 3/2016 | Crites | B64B 1/40 244/31 |

OTHER PUBLICATIONS

Jones et al., "Montgolfiere Balloon Missions for Mars and Titan", 2005.
P. G. Scott et al. "Long Duration Balloon Technology Survey." Final Report: Report No. WII-9942-01-TR-01. Wizen International, Inc. Mar. 11, 1989, 66 pages. Retrieved from: <http://www.dtic.mil/dtic/tr/fulltext/u2/a206975.pdf>.
U.S. Department of Transportation, "Balloon Flying Handbook", Federal Aviation Administration, Flight Standards Service, 2008.
Winker, "Pumpkins and Onions and Balloon Design", Adv. Space Res., vol. 30, No. 5, pp. 1199-1204, 2002.
X. Deng. "Clefted Equilibrium Shapes of Superpressure Balloon Structures." California Institute of Technology, Pasadena, California. © 2012, 158 pages. Retrieved from: <http://thesis.library.caltech.edu/7141/>.
Yajima, "A New Design and Fabrication Approach for Pressurized Balloon", Adv. Space Re., vol. 26, No. 9, pp. 1357-1360, 2000.

* cited by examiner

REINFORCING RIPSTOP TAPE FOR BURST MITIGATION

CROSS-REFERENCE TO RELATED APPLICATIONS

The present application claims the benefit of the filing date of U.S. Provisional Patent Application No. 61/918,854 filed Dec. 20, 2013 the entire disclosure of which is hereby incorporated herein by reference.

BACKGROUND

Computing devices such as personal computers, laptop computers, tablet computers, cellular phones, and countless types of Internet-capable devices are increasingly prevalent in numerous aspects of modem life. As such, the demand for data connectivity via the Internet, cellular data networks, and other such networks, is growing. However, there are many areas of the world where data connectivity is still unavailable, or if available, is unreliable and/or costly.

Some systems may provide network access to remote locations or to locations with limited networking infrastructure via a balloon network operating in the stratosphere. The balloons may be made of a flexible envelope material configured in sections or lobes to create a "pumpkin"-type or lobed balloon. Due to extreme environmental and other conditions, the balloon may fail. In case of failure, a parachute may be employed to control the descent of the balloon. Unfortunately, in some situations, the balloon failure itself may damage or otherwise render the parachute unworkable.

SUMMARY

Aspects of the disclosure provide a balloon-based system that alleviates the risk of catastrophic envelope failure while maintaining a safe descent rate of the balloon.

According to one aspect, a balloon envelope comprises a plurality of gore panels affixed to one another and a ring of reinforcing tape. Each gore panel comprises a film. A first end of each gore panel terminates at a top member along an apex of the balloon envelope, and a second end of each gore panel terminating at a base member along a bottom of the balloon envelope. The balloon envelope has an upper portion and a lower portion, the upper portion lying above an equator of the balloon envelope when the balloon envelope is inflated, and the lower portion lying below the equator of the balloon envelope when the balloon envelope is inflated. The ring of reinforcing tape circumscribes the upper portion of the balloon envelope. The ring of reinforcing tape is configured as a ripstop to prevent a tear from extending upward to the apex of the balloon envelope.

In one example, the balloon envelope further comprises a plurality of tendons affixed to the top member and to the bottom member. Each tendon is positioned over one of the plurality of gore panels. The tendons are configured to keep the gore films arranged in a parachute configuration in the event of a catastrophic envelope failure. In another example, the ring of reinforcing tape circumscribing the upper portion of the balloon envelope is positioned at a predetermined set point along the upper portion of the balloon envelope. In this case, the set point may be selected to be on the order of ⅓ the distance down from the apex to the base of the gore. Alternatively, the set point may be selected to be between 25% to 40% of the distance down from the apex to the base of the gore.

In another example, the ring of reinforcing tape comprises a continuous band of reinforcing tape. In a further example, the ring of reinforcing tape is secured to each of the plurality of gore panels when the gore panels are sealed together. In yet another example, the ring of reinforcing tape is secured to the plurality of gore panels by a pressure sensitive adhesive. The reinforcing tape may be formed of an extensible material. For instance, the extensible material may be LLDPE.

In another example, the reinforcing tape comprises the same material as the film. In a further example, the reinforcing tape is selected to have a coefficient of thermal expansion that matches a coefficient of thermal expansion of the film.

According to another aspect, a method of manufacturing a balloon envelope is provided. The method comprises: preparing one or more gore panels on a work area, each gore panel comprising a film and having an upper portion and a lower portion, the upper portion lying above an equator of the balloon envelope when inflated, and the lower portion lying below the equator of the balloon envelope when is inflated; for each gore panel, placing a segment of reinforcing tape longitudinally across that gore panel along the upper portion thereof; securing the segment of reinforcing tape to the gore panel; and securing adjacent gore panels to one another to form the balloon envelop, a first end of each gore panel terminating at an apex of the balloon envelope, and a second end of each gore panel terminating at a base of the balloon envelope; wherein the segments of reinforcing tape align with one another to circumscribe the balloon envelope in a ring, the ring of reinforcing tape being configured as a ripstop to prevent a tear from extending upward to the apex of the balloon envelope.

In one example, securing the segment of reinforcing tape to the gore panel is done by applying a pressure sensitive adhesive. In another example, the ring of reinforcing tape is positioned at a predetermined set point along the upper portions of the gore panels. For instance, the set point may be selected to be on the order of ⅓ the distance down from the apex to the base of the balloon envelope. Alternatively, the set point is selected to be between 25% to 40% of the distance down from the apex to the base of the balloon envelope.

According to another example, the method further comprises affixing a plurality of tendons to the apex and to the base of the balloon envelope. Here, each of the plurality of tendons is positioned over one of the plurality of gore panels, wherein the tendons are configured to keep the gore films arranged in a parachute configuration in the event of a catastrophic envelope failure. In a further example, the segments of reinforcing tape are part of a continuous band of tape. And in yet another example, for each gore panel, securing the segment of reinforcing tape to the gore panel is done as that gore panel is sealed to an adjacent gore panel.

DETAILED DESCRIPTION

Overview

The technology relates generally to fabricating balloon envelopes for use with high-altitude balloons in a communications network. More particularly, the technology pertains to handling a catastrophic failure of the envelope during operation of the balloon.

One way to deal with a catastrophic material failure is to employ a system at the apex of the balloon envelope that includes a main parachute, a drogue parachute and a redundant cut-down assembly. The main parachute may only be used in the event of a catastrophic failure to control the rate of descent of the balloon. It is possible to utilize the envelope itself as a parachute, which would enable removal of the main parachute. However, in the case of an envelope failure, for instance due to a burst, the failure itself might shred or otherwise damage the envelope parachute, causing a rapid descent.

A pumpkin-type or lobed balloon is typically formed from multiple thin film envelope lobes ("gores"). Adjacent gore edges are connected to each other, for instance using an adhesive sealant. Tendons positioned on centerlines of the envelope gores may be used to carry the load caused by pressurized lifting gas within the balloon envelope. An envelope may fail in one of three ways. These are a seam failure, a film failure, and a tendon snap.

A seam failure will usually result in a non-catastrophic leak. The gore film may fail at a point of highest strain, which is usually on the largest lobe at or near the equator of the envelope. If a tendon snaps, the underlying restrained lobe (gore) will bulge out, and the envelope will fail, also at or near the equator. These latter two situations will most likely result in a catastrophic failure of the envelope.

The technology discussed herein seeks to restrict such failures to the bottom half of the balloon envelope. By doing so, the top half of the envelope would still retain lift gas and be able to function as a parachute for the descent phase. Before going into the specifics of this, a discussion of the overall balloon system is provided.

Example Balloon Systems

Figure 1:
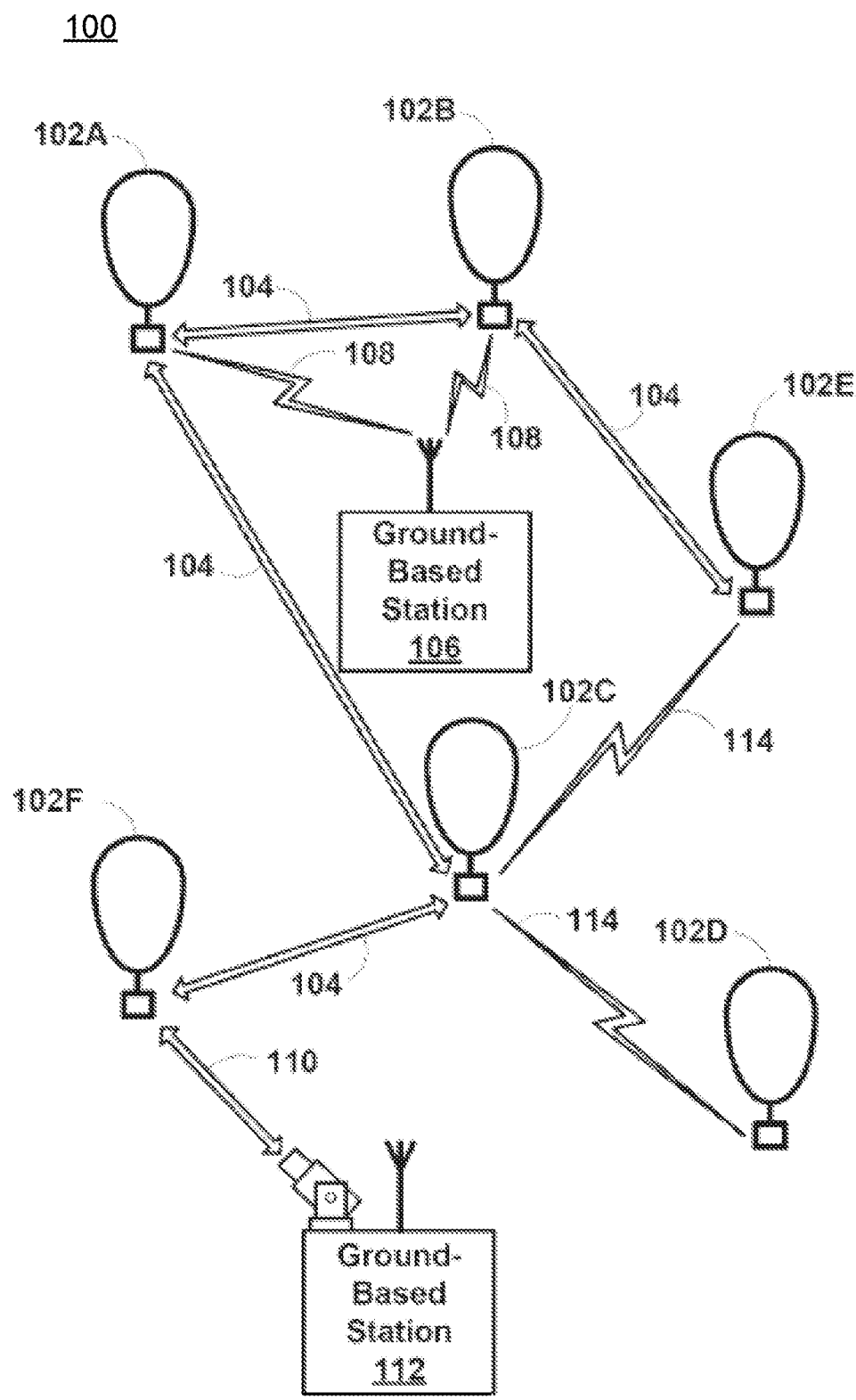
FIG. 1 is a functional diagram of an example system in accordance with aspects of the disclosure.

FIG. 1 depicts an example system 100 in which the balloons described above may be used. This example should not be considered as limiting the scope of the disclosure or usefulness of the features described herein. System 100 may be considered a "balloon network." In this example, balloon network 100 includes a plurality of devices, such as of balloons 102A-F as well as ground-base stations 106 and 112. Balloon network 100 may also include a plurality of additional devices, such as various computing devices (not shown) as discussed in more detail below.

The devices in system 100 are configured to communicate with one another. As an example, the balloons may include free-space optical links 104 and/or radiofrequency (RF) links 114 in order to facilitate intra-balloon communications. In this way Balloons 102A-F may collectively function as a mesh network for packet data communications. At least some of balloons 102A-B may be configured for RF communications with ground-based stations 106 and 112 via respective RF links 108. Some balloons, such as balloon 102F, could be configured to communicate via optical link 110 with ground-based station 112.

A given balloon 102 may be configured to transmit an optical signal via an optical link 104. In one example, the given balloon 102 may use one or more high-power light-emitting diodes (LEDs) to transmit an optical signal. Alternatively, some or all of the balloons 102 may include laser systems for free-space optical communications over the optical links 104. Other types of free-space optical communication are possible. Further, in order to receive an optical signal from another balloon via an optical link 104, the balloon may include one or more optical receivers.

As noted above, one or more balloons may also utilize one or more of various different RF air-interface protocols for communication with ground-based stations via respective RF links. For instance, some or all of balloons 102A-F may be configured to communicate with ground-based stations 106 and 112 via RF links 108 using various protocols described in IEEE 802.11 (including any of the IEEE 802.11 revisions), cellular protocols such as GSM, CDMA, UMTS, EV-DO, WiMAX, and/or LTE, and/or one or more propriety protocols developed for balloon-ground RF communication, among other possibilities.

In some examples, the RF links may not provide a desired link capacity for balloon-to-ground communications. For instance, increased capacity may be desirable to provide backhaul links from a ground-based gateway. Accordingly, an example network may also include downlink balloons, which could provide a high-capacity air-ground link between the various balloons of the network and the ground-base stations. For example, in balloon network 100, balloon 102F may be configured as a downlink balloon.

Like other balloons in network 100, downlink balloon 102F may be operable for optical communication with other balloons via optical links 104. However, downlink balloon 102F may also be configured for free-space optical communication with ground-based station 112 via an optical link 110. Optical link 110 may therefore serve as a high-capacity link (as compared to an RF link 108) between the balloon network 100 and the ground-based station 112. Downlink balloon 102F may additionally be operable for RF communication with ground-based stations 106. In other cases, downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

A downlink balloon may be equipped with a specialized, high bandwidth RF communication system for balloon-to-ground communications, instead of, or in addition to, a free-space optical communication system. The high bandwidth RF communication system may take the form of an ultra-wideband system, which may provide an RF link with substantially the same capacity as one of the optical links 104.

In a further example, some or all of balloons 102A-F could be configured to establish a communication link with space-based satellites in addition to, or as an alternative to, a ground based communication link. In some embodiments, a balloon may communicate with a satellite via an optical link. However, other types of satellite communications are possible.

As noted above, the balloons 102A-F may collectively function as a mesh network. More specifically, since balloons 102A-F may communicate with one another using free-space optical links, the balloons may collectively function as a free-space optical mesh network. In a mesh-network configuration, each balloon may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

The network topology may change as the balloons move relative to one another and/or relative to the ground. Accordingly, the balloon network 100 may apply a mesh protocol to update the state of the network as the topology of the network changes. For example, to address the mobility of the balloons 102A to 102F, the balloon network 100 may employ and/or adapt various techniques that are employed in mobile ad hoc networks (MANETs). Other examples are possible as well.

The balloon network may be configured as a "transparent" mesh network, as an "opaque" mesh network, or both. In a transparent balloon network, the balloons may include components for physical switching that is entirely optical, without any electrical components involved in the physical routing of optical signals. Thus, in a transparent configuration with optical switching, signals travel through a multi-hop lightpath that is entirely optical. In an opaque configuration, some or all of the balloons may use optical-electrical-optical (OEO) switching. For example, some or all balloons may include optical cross-connects (OXCs) for OEO conversion of optical signals.

Balloon network 100 may also implement station-keeping functions to help provide a desired network topology. For example, station-keeping may involve each balloon 102A-F maintaining and/or moving into a certain position relative to one or more other balloons in the network (and possibly in a certain position relative to the ground). As part of this process, each balloon may implement station-keeping functions to determine its desired positioning within the desired topology, and if necessary, to determine how to move to the desired position.

The desired topology may vary depending upon the particular implementation and whether or not the balloons are continuously moving. In some cases, balloons may implement station-keeping to provide a substantially uniform topology where the balloons function to position themselves at substantially the same distance (or within a certain range of distances) from adjacent balloons in the balloon network 100. Alternatively, the balloon network 100 may have a non-uniform topology where balloons are distributed more or less densely in certain areas, for various reasons. As an example, to help meet the higher bandwidth demands, balloons may be clustered more densely over areas with greater demand (such as urban areas) and less densely over areas with lesser demand (such as over large bodies of water). In addition, the topology of an example balloon network may be adaptable allowing balloons to adjust their respective positioning in accordance with a change in the desired topology of the network.

Figure 2:
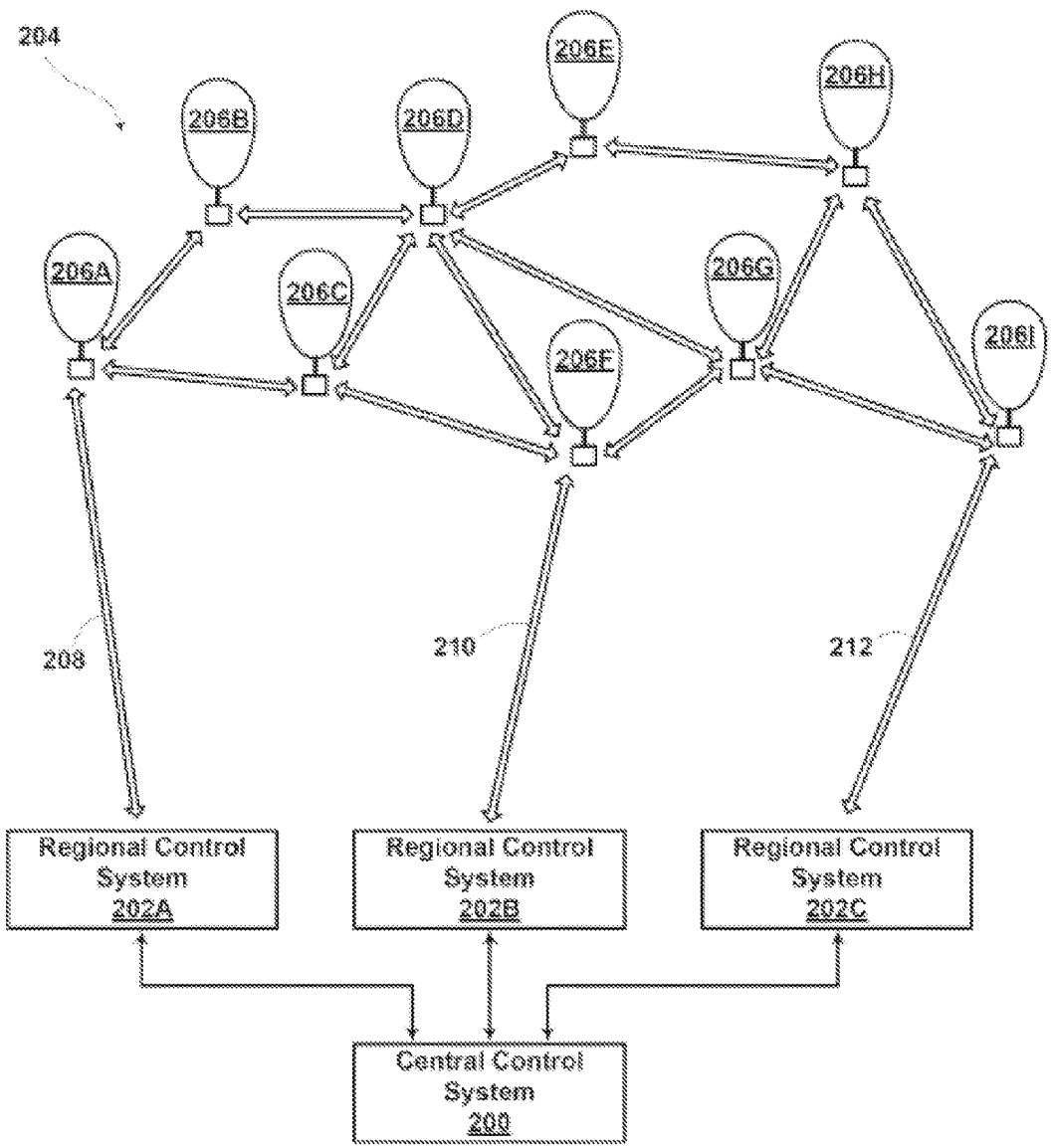
FIG. 2 is another functional diagram of an example system in accordance with aspects of the disclosure.

The mesh networking and/or station-keeping functions may be centralized to control by a designated controller balloon (which aggregates information received from other balloons and sends station-keeping instructions to all other balloons in the balloon network) or by a ground-based station. For example, FIG. 2 depicts a distributed control system, which includes a central control system 200 and a number of regional control-systems 202A and 202B. In this example, regional control systems 202A-C may represent one or more ground-based stations, such as ground-based station 112 of FIG. 1, which is configured to communicate with downlink balloons. Such a control system may be configured to coordinate certain functionality for balloon network 204 (which may be configured the same or similarly to balloon network 100), and as such, may be configured to control and/or coordinate certain functions for balloons 206A-I.

In the example of FIG. 2, central control system 200 may be configured to communicate with balloons 206A-I via a number of regional control systems 202A-C. These regional control systems may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A-C and central control system 200, regional control system 202B may relay communications and/or data between balloons 206D-F and central control system 200, and regional control system 202C may relay communications and/or data between balloons 206G-I and central control system 200.

As with FIG. 1, in order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A-C may respectively communicate with balloons 206A, 206F, and 206I via optical links 206, 208, and 210, respectively.

In a centralized control arrangement, such as that shown in FIG. 2, the central control system 200 (and possibly regional control systems 202A to 202C as well) may coordinate certain mesh-networking functions for balloon network 204. For example, balloons 206A-I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A-I in order to determine an overall state of the network.

Alternatively, control and/or coordination of a balloon network may be de-centralized. For example, each balloon may relay state information to, and receive state information from, some or all nearby balloons. Furthermore, each balloon may relay state information that it receives from a nearby balloon to some or all nearby balloons. When all balloons do so, each balloon may be able to individually determine the state of the network.

The balloons of FIGS. 1 and 2 may be high-altitude balloons that are deployed in the stratosphere. As an example, in a high altitude balloon network, the balloons may generally be configured to operate at altitudes between 18 km and 25 km in order to limit the balloons' exposure to high winds and interference with commercial flights. In order for the balloons to provide a reliable mesh network in the stratosphere, where winds may affect the locations of the various balloons in an asymmetrical manner, the balloons may be configured to move latitudinally and/or longitudinally relative to one another by adjusting their respective altitudes, such that the wind carries the respective balloons to the respectively desired locations.

Figure 3:
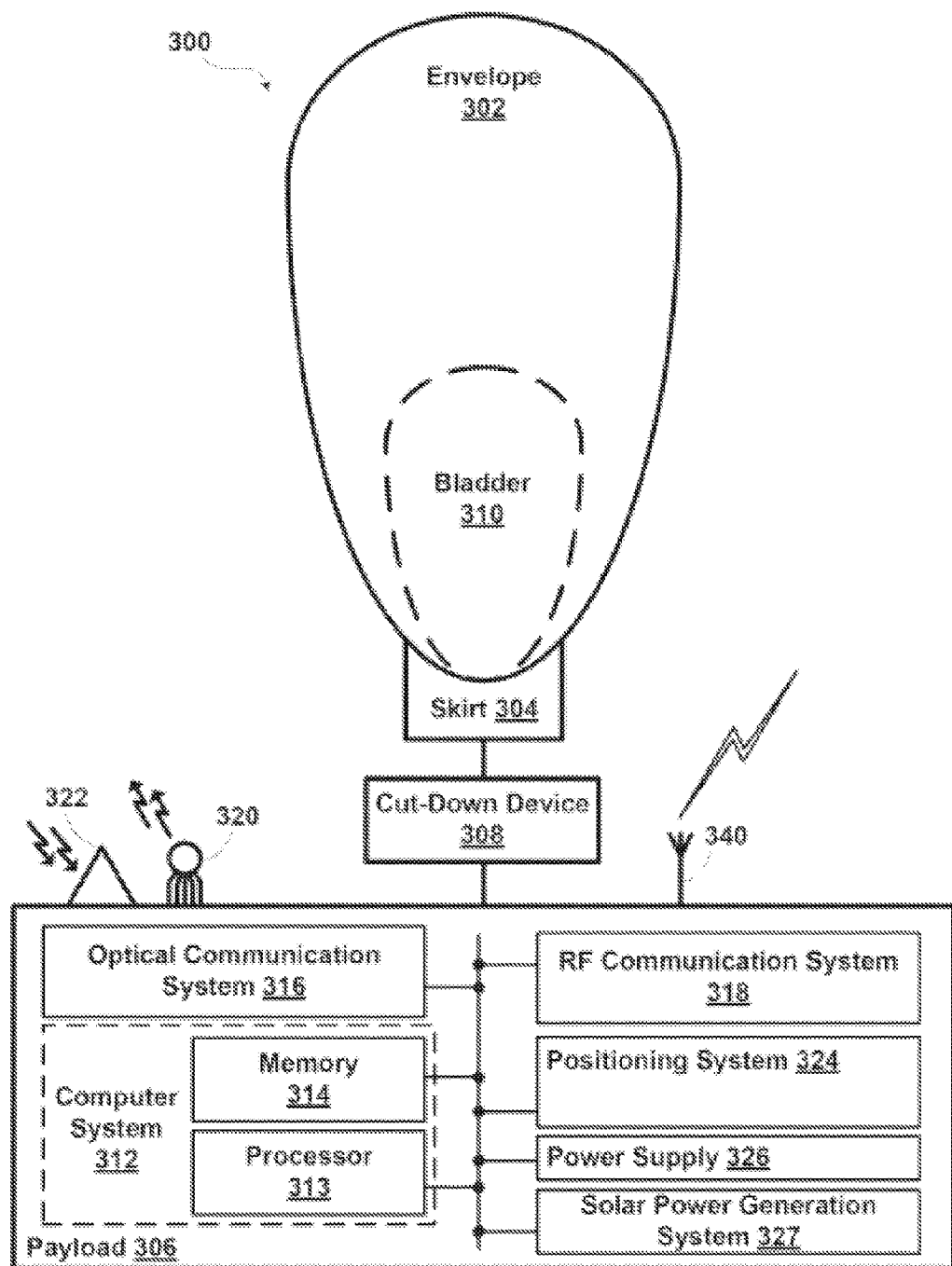
FIG. 3 is an example balloon and payload arrangement in accordance with aspects of the disclosure.

In addition to the communication components described above, in example configurations the high altitude balloons include an envelope and a payload, along with various other components. FIG. 3 is one example of a high-altitude balloon 300, which may represent any of the balloons of FIGS. 1 and 2. As shown, the balloon 300 includes an envelope 302, a skirt 304, a payload 306 and a cut-down device 308.

The envelope 302 and skirt 304 may take various forms. For instance, the envelope 302 and/or skirt 304 may be made of materials such as biaxially-oriented polyethylene terephthalate ("BoPET"). Additionally, or alternatively, some or all of the envelope 302 and/or skirt 304 may be constructed from a highly-flexible latex material or rubber material such as chloroprene. Other materials or combinations thereof may also be employed. Furthermore, the shape and size of the envelope 302 and skirt 304 may vary depending upon the particular implementation. Additionally, the envelope 302 may be filled with different types of gases, such as helium and/or hydrogen. Other types of gases, and combinations thereof, are possible as well.

In the present example, the payload 306 of balloon 300 includes a computer system 312 having one or more processors 313 and on-board data storage in the form of memory 314. Memory 314 of computer system 312 stores information accessible by the processor(s) 313, including instructions that can be executed by the processor. The memory 314 also includes data that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

The data can be retrieved, stored or modified by the one or more processors 313 in accordance with the instructions. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 313 can include any conventional processors, such as a commercially available CPU. Alternatively, each processor can be a dedicated component such as an ASIC or other hardware-based processor. Although FIG. 3 functionally illustrates the processor(s) 313, memory 314, and other elements of computer system 312 as being within the same block, the system can actually comprise multiple processors, computers, computing devices, and/or memories that may or may not be stored within the same physical housing. For example, the memory can be a hard drive or other storage media located in a housing different from that of computer system 312. Accordingly, references to a processor, computer, computing device, or memory will be understood to include references to a collection of processors, computers, computing devices, or memories that may or may not operate in parallel.

The payload 306 of balloon 300 may also include various other types of equipment and systems to provide a number of different functions. For example, as shown payload 306 includes an optical communication system 316, which may transmit optical signals via an ultra-bright LED system 320, and which may receive optical signals via an optical-communication receiver 322 (e.g., a photodiode receiver system). In this regard, optical communication system 316 and optical-communication receiver 322 may facilitate optical links 104 and/or 110 as shown in FIG. 1. Furthermore, payload 306 may also include an RF communication system 318, which transmits and/or receives RF communications via an antenna system 340. In this regard, RF communication system 318 and antenna system 340 may facilitate RF links 108 and/or 114 as shown in FIG. 1.

The payload 306 is illustrated as also including a power supply 326 to supply power to the various components of balloon 300. The power supply 326 could include a rechargeable battery. In addition, the balloon 300 may include a solar power generation system 327. The solar power generation system 327 may include solar panels and could be used to generate power that charges and/or is distributed by the power supply 326.

The payload 306 may additionally include a positioning system 324. The positioning system 324 could include, for example, a global positioning system (GPS), an inertial navigation system, and/or a star-tracking system. The positioning system 324 may additionally or alternatively include various motion sensors (e.g., accelerometers, magnetometers, gyroscopes, and/or compasses). The positioning system 324 may additionally or alternatively include one or more video and/or still cameras, and/or various sensors for capturing environmental data.

Some or all of the components and systems within payload 306 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application. The optical communication system 316 and other associated components are described in further detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, the variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could also be used to improve balloon stability.

As noted above, the envelope 302 may be filled with various gasses such as helium, hydrogen or any other lighter-than-air material. The envelope 302 could thus have an associated upward buoyancy force. Thus, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

Alternatively, the envelope 302 could be substantially rigid and include an enclosed volume. Air could be evacuated from envelope 302 while the enclosed volume is substantially maintained. In other words, a least a partial vacuum could be created and maintained within the enclosed volume. Thus, the envelope 302 and the enclosed volume could become lighter-than-air and provide a buoyancy force. In yet other embodiments, air or another material could be controllably introduced into the partial vacuum of the enclosed volume in an effort to adjust the overall buoyancy force and/or to provide altitude control.

A portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, in various contemplated embodiments, altitude control of balloon 300 could be achieved, at least in part, by adjusting the rotation of the balloon with respect to the sun.

Payload 306 may include a navigation system (not shown) separate from, or partially or fully incorporated into computer system 312. The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground based or satellite based control system and communicated to the high-altitude balloon. In other embodiments, specific may be configured to compute altitudinal adjustments for other balloons and transmit the adjustment commands to those other balloons.

Figure 4:
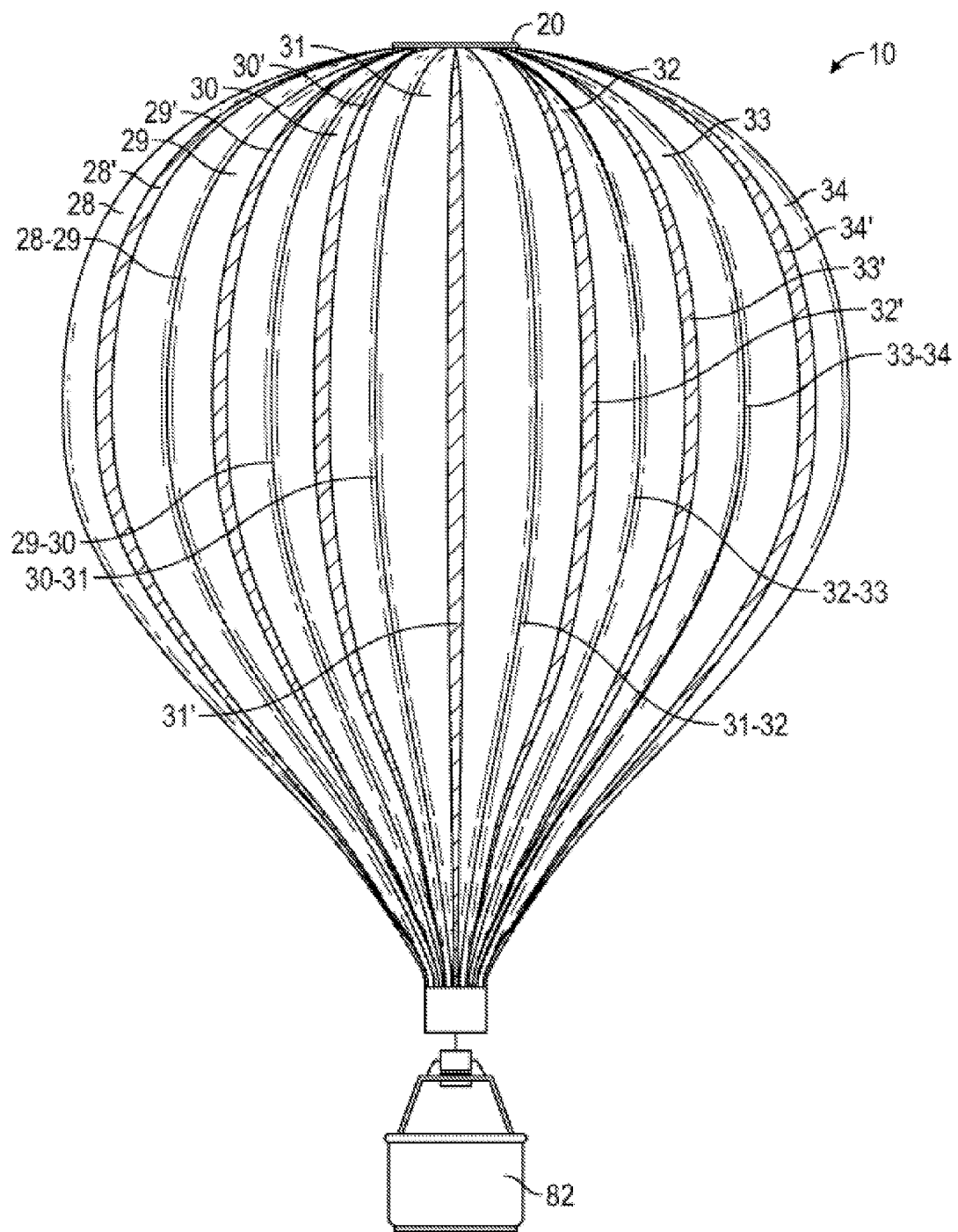
FIG. 4 is another example balloon and payload arrangement in accordance with aspects of the disclosure.

FIG. 4 is an example configuration of an envelope 10 of a pumpkin-type balloon, which may be one implementation of the balloon 300. As shown, attached to balloon 10 is payload 82 that may represent payload 306 of FIG. 3. In view of the goal of making the balloon envelope 10 as lightweight as possible, the balloon envelope is comprised of a plurality of envelope lobes or gores comprised of a thin film, such as polyethylene or polyethylene terephthalate, which is lightweight yet has suitable strength properties for use as a balloon envelope.

In this example, balloon envelope 10 is comprised of multiple envelope gores and tendons. As shown, envelope gore 30 is attached to adjacent envelope 31 at edge seam 30-31 and to adjacent envelope gore 29 at edge seam 29-30. Envelope gore 28 is shown attached to envelope gore 29 at edge seam 28-29. Envelope gore 32 is shown attached to adjacent envelope gore 31 at edge seam 31-32 and to adjacent envelope gore 33 at edge seam 32-33. Envelope gore 34 is shown attached to envelope gore 33 at edge seam 33-34. The edge seams between adjacent envelope gores may be formed by heat sealing, although other means of attachment that provide for an air tight seal between adjacent envelope gores may also be used. In one example, the envelope gores are comprised of polyethylene having a thickness of 1.5 to 2 mils. In another example, the material film has a thickness of between 1 to 5 mils. Each of the respective envelope gores extend to balloon apex having a top member 20.

The individual envelope gores 28-34 may be shaped so that the length of the edge seam connecting adjacent envelope gores is greater than the length of a centerline of the envelope gores. Thus, the envelope gores may be shaped to better optimize the strain rate experienced by the balloon envelope. The pressurized lifting gas within the balloon envelope 10 may cause a force or load to be applied to the balloon envelope. Tendons, such as load tapes or straight fiber cables, may be used to provide strength to the balloon envelope and to help withstand the load created by the pressurized gas within the balloon envelope.

In the present example, a tendon 28' is shown positioned on a centerline of envelope gore 28, a tendon 29' is shown positioned on a centerline of envelope gore 29, a tendon 30' is shown positioned on a centerline of envelope gore 30, a tendon 31' is shown positioned on a centerline of envelope gore 31, a tendon 32' is shown positioned on a centerline of envelope gore 32, a tendon 33' is shown positioned on a centerline of envelope gore 33, and a tendon 34' is shown positioned on a centerline of envelope gore 34.

Furthermore, the individual gores 28-34 are shaped so that the length of the edge seam connecting adjacent gores is greater than the length of the centerline of the gores. Therefore, when inflated, there is an excess of envelope material (that includes the edge seams between the adjacent envelope gores) that bulges out somewhat before there is any strain on the envelope material. Therefore, the load is instead applied to the shortest section of the gore—the centerline of the adjacent gores 28-34 where the longitudinal tendons 28'-34' are applied. Thus, the balloon envelope 10 takes on more of a pumpkin shape with the edge seams 28-29, 29-30, 30-31, 31-32, 32-33, and 33-34 of the respective envelope gores bulging outward between the respective tendons 28'-34'. This design allows for reduced stress and strain on the balloon envelope 10, as the load is designed to be carried primarily by the tendons 28'-34', rather than the balloon envelope material in envelope gores 28-34.

Example Envelope Parachute Solutions

There are different solutions for creating a parachute from the balloon envelope. Certain examples are provided in U.S. patent application Ser. No. 14/042,009, filed Sep. 30, 2013, which is entitled "Methods and Systems for Turning an Envelope Into a Parachute" and is incorporated by reference.

As noted above, one aspect of the technology seeks to restrict catastrophic envelope failures to the bottom half of the envelope. In this manner, the upper portion of the envelope is capable of retaining lift gas, which enables it to function as a parachute during descent. For instance, if, during the balloon manufacturing process, one or more sections of tape were to be laid across the envelope gores at an equal distance to form a ring around an upper portion of the envelope, this reinforcement would hold the film of the gore together and resist a vertical tear that may be created in the film upon failure.

Figure 5:
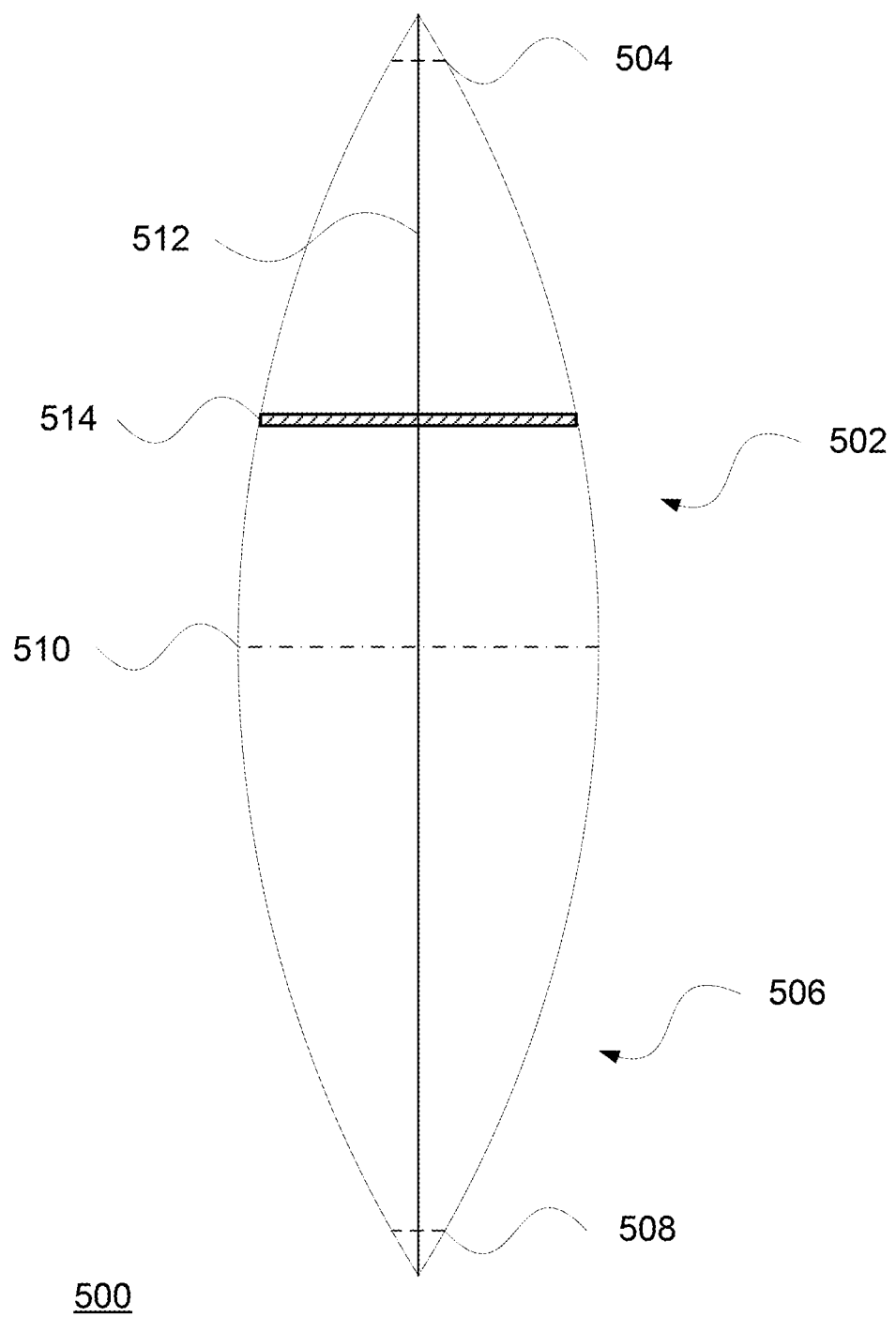
FIG. 5 illustrates a reinforced gore member in accordance with aspects of the disclosure.

FIG. 5 illustrates an example gore 500 usable in the balloons described above. The gore 500 includes an upper portion 502 having an apex section 504 configured for connection to an apex load ring (not shown) positioned at the top of the balloon envelope, and a lower portion 506 having a base section 508 configured for connection to a base load ring (not shown) positioned at the bottom of the balloon envelope. For illustration purposes, an equator or centerline 510 is illustrated by the dotted-dashed line at the midpoint of the gore 500. Tendon (e.g., webbing or load tape) 512 is shown running longitudinally from the apex to the base of the gore 500. As noted above, the tendon is configured to provide strength to the gore section and to help withstand the load created by the pressurized gas within the envelope when the balloon is in use.

Also shown in FIG. 5 is a segment of reinforcing tape 514. The reinforcing tape 514 may be laid down at a fixed latitude for each gore section. As illustrated, the reinforcing tape 514 is positioned at a set point in the upper portion 502 of the gore 500. The set point is some selected distance below the apex of the gore 500. In one example, the reinforcing tape 514 is located at a set point on the order of ⅓ the distance down from the apex to the base of the gore 500. In another example, the reinforcing tape 514 may be positioned between 25% to 40% of the way down from the apex to the base of the gore 500.

The reinforcing tape 514 may be laid by machine for the gore sections 500 of the balloon envelope. If laid in straight lines, the cost would be minimal for fabrication, and the weight would be very small relative to a conventional parachute and associated systems. As each reinforcing tape segment is positioned at the same latitude, the result is a ring of reinforcing tape that circumscribes the balloon envelope. An example of this is illustrated in the balloon 600 of FIG. 6.

As shown, the balloon 600 includes envelope 602 formed from a plurality of gores 604, which results in a pumpkin configuration when the envelope is inflated. The plurality of gores 604 terminate at the apex at top member 606 and at the bottom at base member or skirt 608. The balloon 600 also includes a payload 610 and may have a cut-down device 612. The equator 614 of the envelope is represented by a dotted and dashed line. A ring 616 of reinforcing tape is shown circumscribing an upper portion of the envelope 602, at a latitude above the equator 614. The ring 616 may mostly (e.g., more than 50%), substantially (e.g., more than 75%) or completely circumscribe the upper portion of the envelope. As discussed above, the set point for the ring 616 of reinforcing tape may be located approximately ⅓ the distance down from the apex to the base of the gore 500. In another example, the ring 614 of reinforcing tape is positioned between 25% to 40% of the distance down from the apex to the base of the gore 500.

In a further example, the set point is chosen based on how much parachute surface area or overall volume is desired. For instance, the distance from the apex is chosen to create a parachute for the appropriate system weight. Thus, in one example, the overall size of the reinforced top section from the top member 606 to the ring 616 of reinforcing tape is on the order of 20 to 30 cubic meters. In another example, the parachute has a diameter on the order of 11 meters (or between about 10 to 12 meters). In a further example, the parachute is sized to extend approximately 5.5 meters (or between 4.5 to 6.5 meters) down the envelope starting adjacent the apex. And in yet another example, the parachute is sized to extend no more than ⅓ the way down the envelop starting adjacent the apex. These examples provide sufficient area to contain lift gas. The tendons (not shown in FIG. 6) are configured to keep the top film of the envelope in a parachute configuration in the event of a catastrophic failure. A top cutdown (not shown) can be employed to act as a stabilizing vent hole for the envelope. One goal is to maintain the lift gas to retain parachute shape for the initial stage of descent and maintain orientation immediately following the burst event. This allows for clean firing of a primary parachute system if it is retained. It is not necessary, and may not be desirable, to keep the lift gas all the way to the ground.

As noted above, if the gore film fails, it will most likely occur at a point of highest strain, which is usually on the largest lobe at or near the equator of the envelope. And if a tendon overlying a gore snaps, the underlying gore will bulge out and the envelope may fail at or near the equator. Such failures may cause a tear longitudinally along the affected gore. The reinforcing tape acts as a ripstop to prevent the tear from extending upward to the apex of the envelope.

Figure 6:
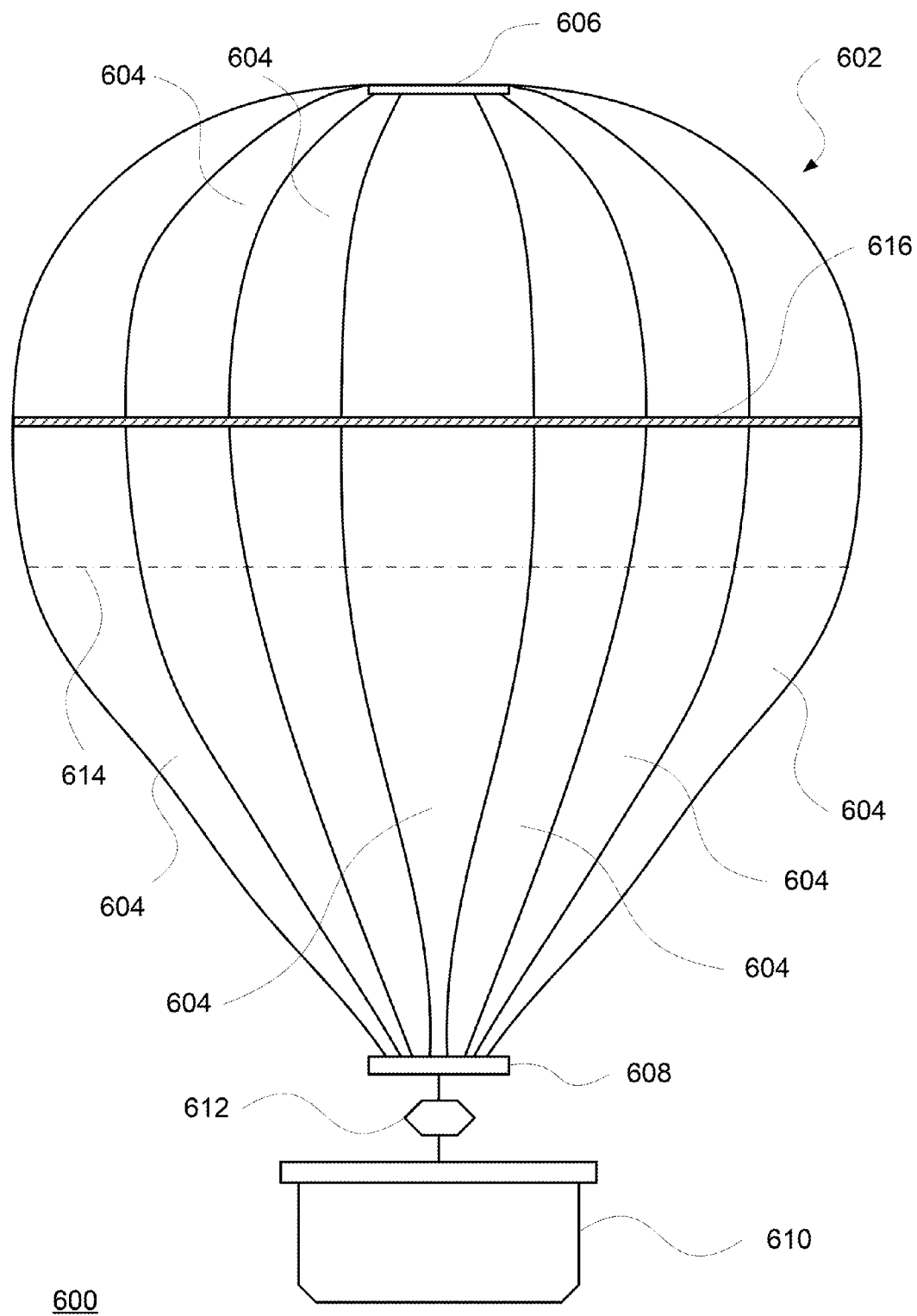
FIG. 6 illustrates a reinforced balloon envelope in accordance with aspects of the disclosure.

The reinforcing tape should have width sufficient to arrest a tear in progress. In one example, a one inch thickness is sufficient width for a two mil PE film material. The width may be wider or narrower depending on the film used. For instance, it may be wider, e.g., between 1-3 inches, for a stronger film having more rupture force. While only one band of reinforcing tape is shown in FIG. 6, multiple bands may be employed to produce the desired effect, namely to act as a ripstop.

The reinforcing tape should be of a material (or materials) that are extensible, as this prevents loading during envelope pressurization and limits the strain placed on the tape during normal flight operations. In contrast, inextensible strapping tape, such as fiberglass tape, does not strain with the gore film. By way of example only, a co-extrusion of linear low-density polyethylene (LLDPE) may be employed. Alternatively, BoPET could be used. However, upon fracturing, BoPET will propagate a tear with less resistance than polyethylene (PE). In another alternative, the reinforcing tape may be formed of the same material as the envelope film. And in a further alternative, the reinforcing tape material may be selected so that its coefficient of thermal expansion (CTE) matches that of the envelope film. Or the film and/or the reinforcing tape may be selected so that the tear loses force as it runs through the film. Furthermore, the reinforcing tape may be selected to exhibit extensibility compatible with the envelope film at the temperatures and ultraviolet (UV) exposure levels found in the stratosphere.

The one or more segments of reinforcing tape can be held in place with a pressure sensitive adhesive (PSA) that bonds to the envelope film. Hot melt or two-part adhesives may also be employed.

Figure 7:
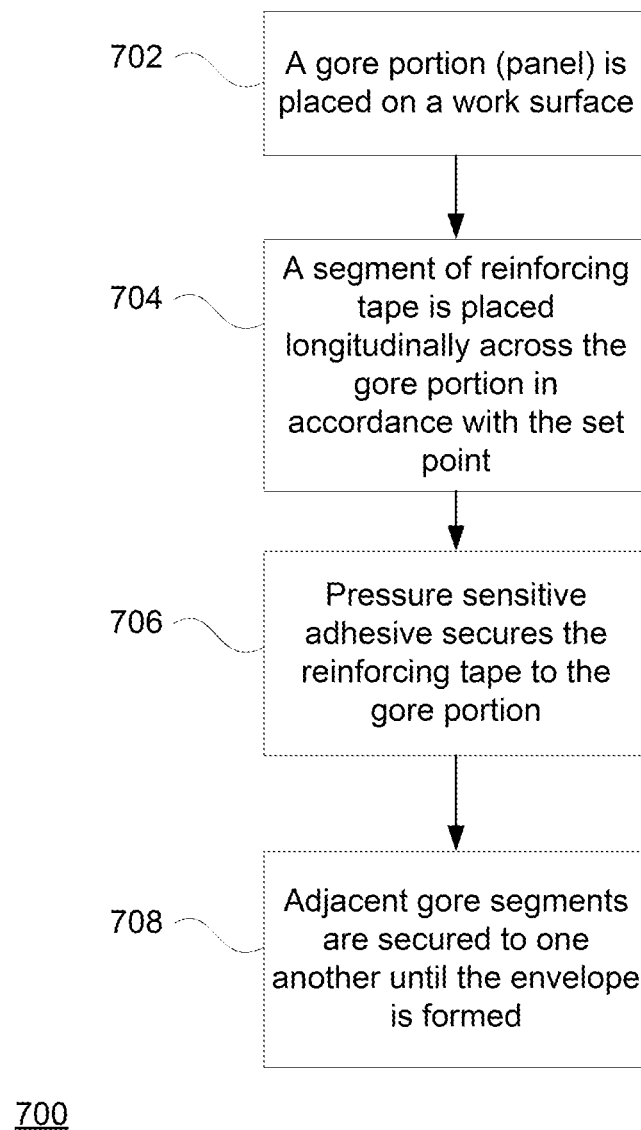
FIG. 7 is an example method of fabricating a balloon envelope with reinforcing ripstop tape for burst mitigation in accordance with aspects of the disclosure.

FIG. 7 is an example flow diagram 700 for manufacturing balloon envelopes with reinforcing ripstop tape as described above. In this example, an envelope gore portion (panel) is placed on a table, work surface or other work area at block 702. As an example, one or more of gore panels may be placed on the work surface at the same time.

Next, a segment of reinforcing tape is placed longitudinally across a given gore panel at block 704. The segment is positioned in accordance with a predetermine set point, for instance approximately ⅓ (but no more than halfway) down the panel. As noted above, multiple segments of reinforcing tape may be used instead of a single segment.

As shown at block 706, the one or more segments of reinforcing tape are secured to the gore panel. The segment may be secured using a pressure sensitive adhesive or other fastening means. Once the reinforcing tape is secured in place for a given gore panel, the gore panels are secured to one another to form the balloon envelope at block 708. Alternatively, the one or more segments of reinforcing tape may be affixed to the gore panels while the panels are being secured to one another, or thereafter. In one scenario, a continuous band of tape is adhered to one gore after another as the gores are sealed together.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of manufacturing a balloon envelope, the method comprising:
   preparing one or more gore panels on a work area, each gore panel comprising a film and having an upper portion and a lower portion and defining a longitudinal axis between an end of the upper portion and an end of the lower portion, the upper portion lying above an equator of the balloon envelope when inflated, and the lower portion lying below the equator of the balloon envelope when is inflated;
   for each gore panel, placing a segment of reinforcing tape across that gore panel along the upper portion thereof so that the segment of reinforcing tape is aligned substantially perpendicular to the longitudinal axis;
   securing the segment of reinforcing tape to the gore panel; and
   securing adjacent gore panels to one another to form the balloon envelop, a first end of each gore panel terminating at an apex of the balloon envelope, and a second end of each gore panel terminating at a base of the balloon envelope;
   wherein the segments of reinforcing tape align with one another to circumscribe the balloon envelope in a ring, the ring of reinforcing tape being configured as a ripstop to prevent a tear from extending upward to the apex of the balloon envelope.

2. The method of claim 1, wherein securing the segment of reinforcing tape to the gore panel is done by applying a pressure sensitive adhesive.

3. The method of claim 1, wherein the ring of reinforcing tape is positioned at a predetermined set point along the upper portions of the gore panels.

4. The method of claim 3, wherein the set point is selected to be on the order of ⅓ the distance down from the apex to the base of the balloon envelope.

5. The method of claim 3, wherein the set point is selected to be between 25% to 40% of the distance down from the apex to the base of the balloon envelope.

6. The method of claim 1, further comprising affixing a plurality of tendons to the apex and to the base of the balloon envelope, each of the plurality of tendons being positioned over one of the plurality of gore panels, wherein the tendons are configured to keep the gore films arranged in a parachute configuration in the event of a catastrophic envelope failure.

7. The method of claim 1, wherein the segments of reinforcing tape are part of a continuous band of tape.

8. The method of claim 1, wherein, for each gore panel, securing the segment of reinforcing tape to the gore panel is done as that gore panel is sealed to an adjacent gore panel.

* * * * *